Oct. 29, 1929.  F. McNEILL  1,733,616
LIQUID LEVEL INDICATOR
Filed Aug. 23, 1926  3 Sheets-Sheet 1
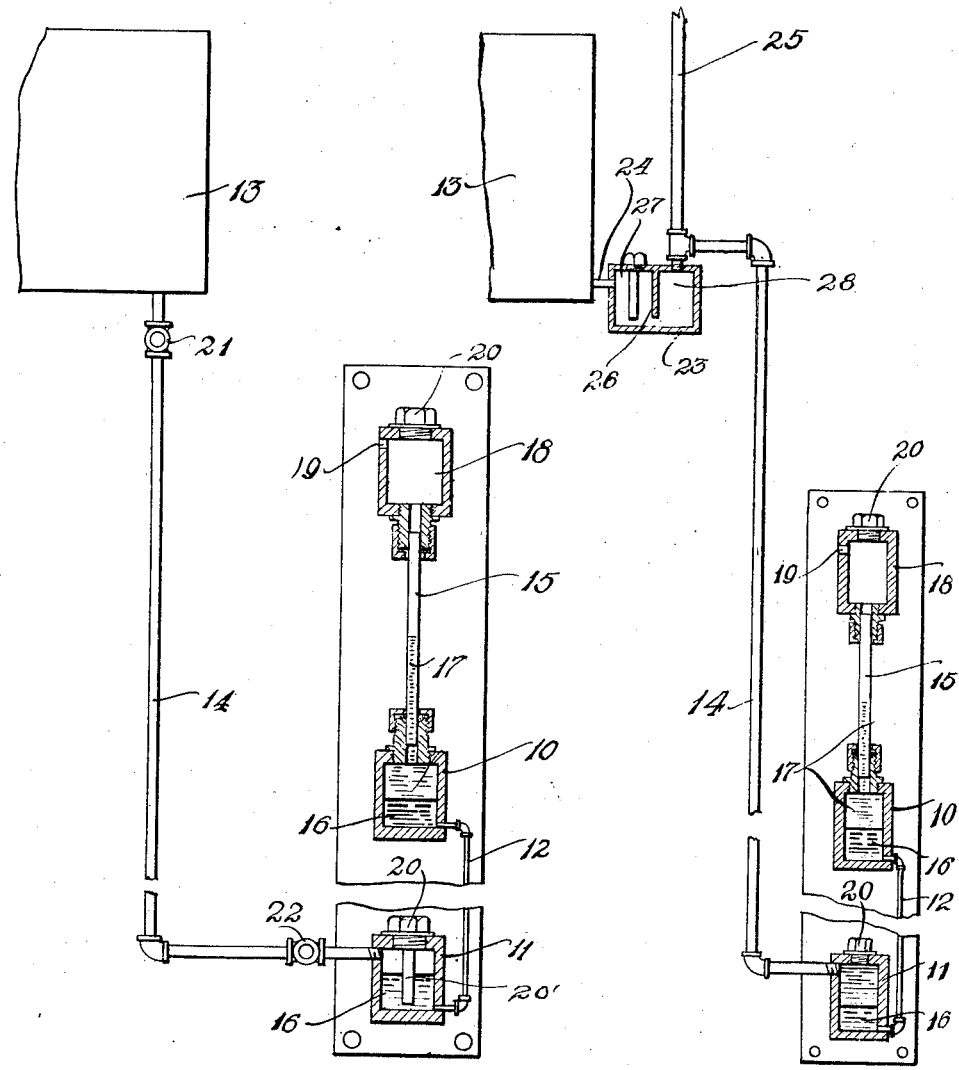

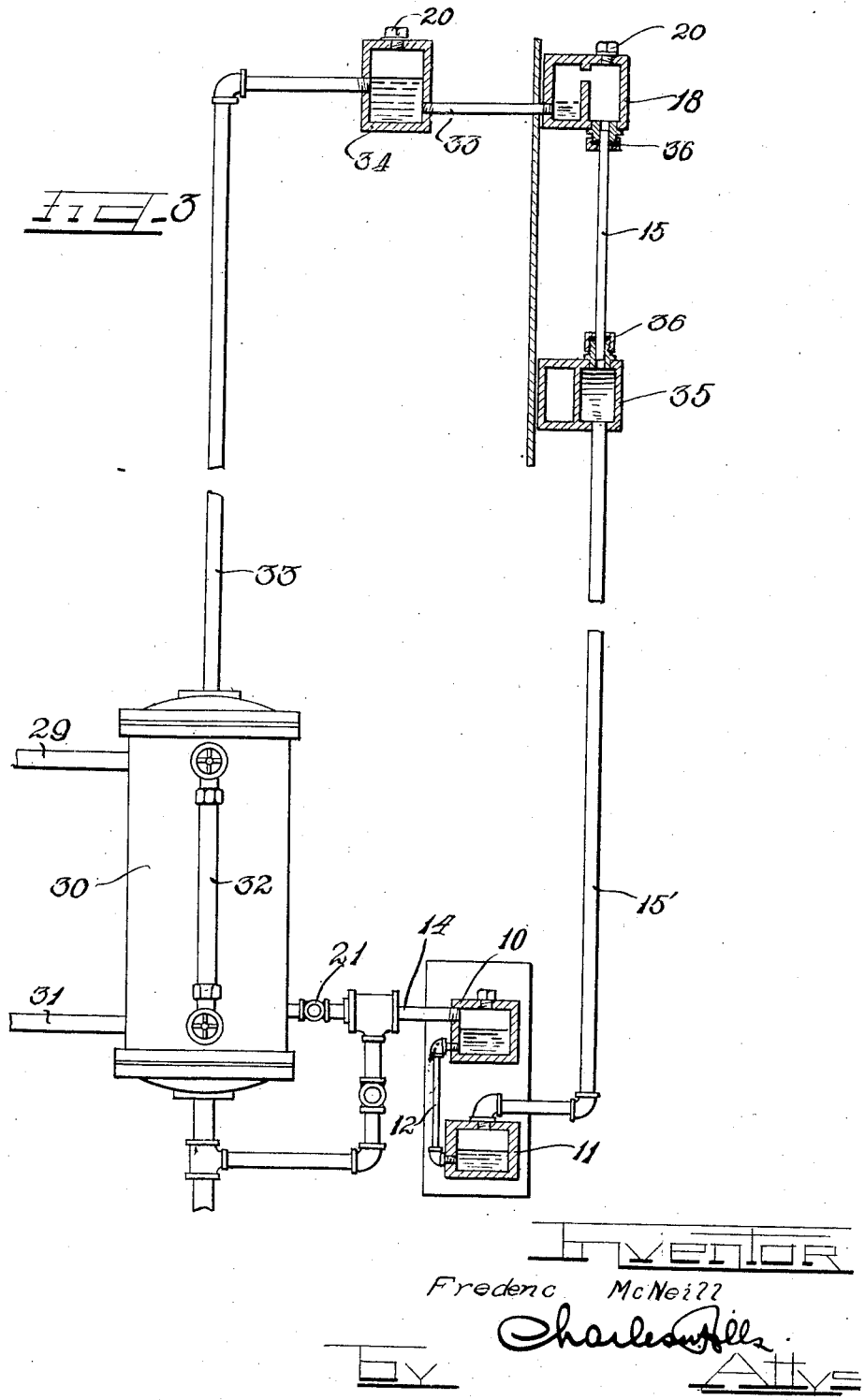

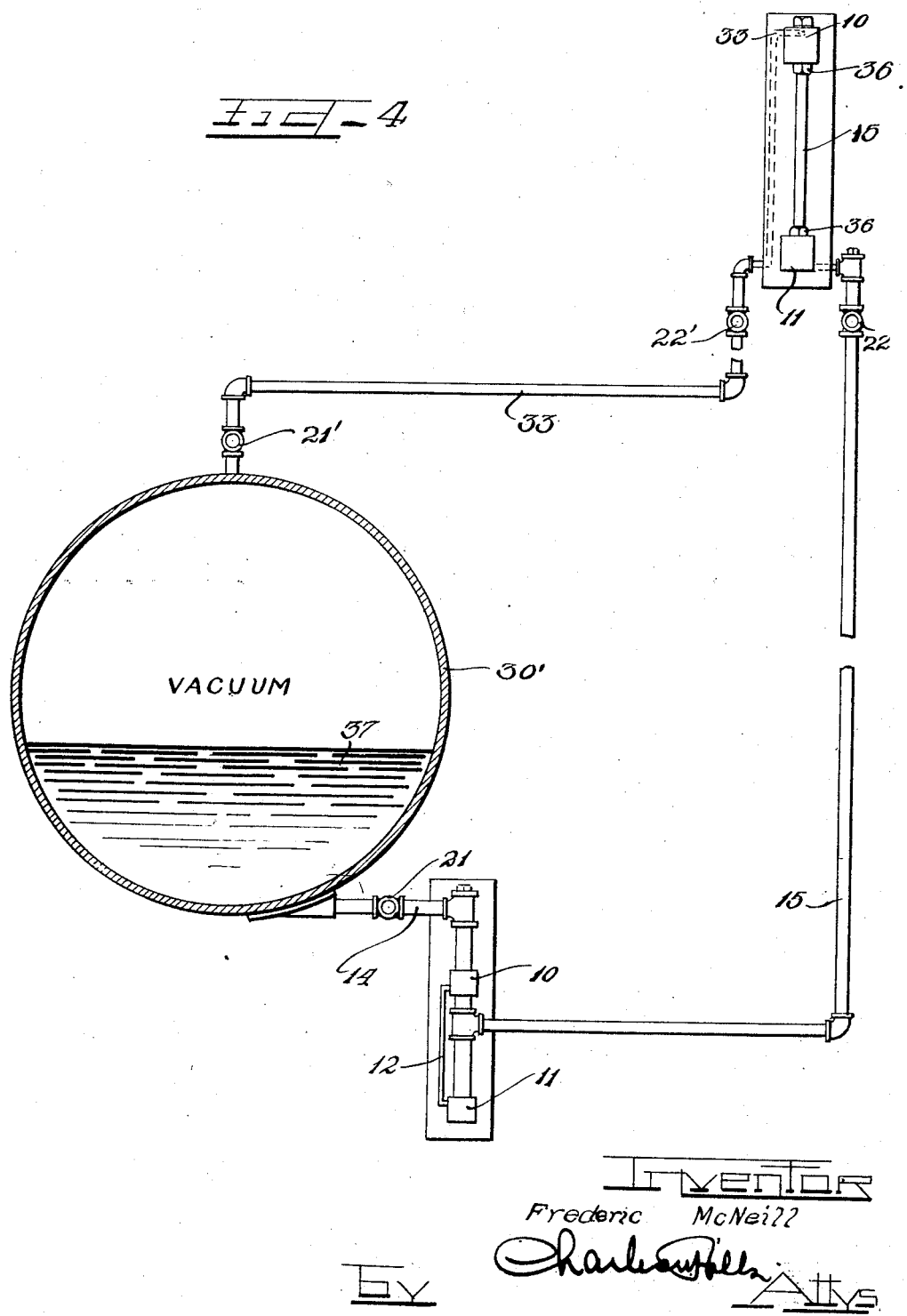

Patented Oct. 29, 1929

1,733,616

UNITED STATES PATENT OFFICE

FREDERIC McNEILL, OF CHICAGO, ILLINOIS, ASSIGNOR TO BOILER ROOM IMPROVEMENT CO., A COPARTNERSHIP CONSISTING OF T. W. McNEILL AND IRA J. BABCOCK, OF CHICAGO, ILLINOIS

LIQUID-LEVEL INDICATOR

Application filed August 23, 1926. Serial No. 130,795.

This invention relates to improvements in liquid level indicators. Some of the objects is to provide an instrument that may be used to gage or indicate the relative changeable height of a liquid or liquid head in a container, located remotely from the indicator; which indicator may be placed at an elevation above or below the container with equal facility; which will operate with dependable integrity in connection with a container maintained at sub-atmospheric pressure; above atmospheric pressure, as steam boilers wherein the pressure is maintained at times at several hundred pounds, and in connection with open tanks.

Another object is to provide a single instrument that may be made to function in the different environments equally well by connecting it in a manner to suit the several occasions and conditions, and calibrating it to suit the particular situation.

Other objects, advantages, benefits and refinements will hereinafter appear from a consideration of the following description when taken in connection with the accompanying drawings wherein:

On the drawings:

Figure 1 is a vertical central section of the instrument showing it located below and connected to an open container or tank.

Figure 2 is a similar view showing the manner of its use in connection with a tank containing an exceedingly viscous material which would not flow readily through small pipes.

Figure 3 shows the manner of connecting the instrument to a steam boiler.

Figure 4 shows the manner of connecting the instrument to a closed tank or container maintained at sub-atmospheric pressure and showing the indicating glass located at an elevation above the tank.

In all of the views the same reference characters indicate similar parts.

The device, in which a water glass or tube may be employed to indicate the variation of head or liquid level in a container, boiler or tank and at any suitable elevation, above or below the container, consists, generally, of two casings 10 and 11. The casing 10 is preferably located immediately above the casing 11. The bottom end of casing 11 is connected to the bottom end of casing 10 by a relatively small pipe 12. In Figures 1 and 2 the top end of casing 11 is connected to the container 13, which may be an open container or tank by a pipe 14. The pipes 12 and 14 are shown broken to indicate that they may be of varying length. To the top end of the container 10 (Figures 1 and 2), a liquid level indicating glass tube 15 is connected. This tube may be substituted by a suitable gage, having a Bourdon spring or the like. For the purpose of this disclosure I have shown the usual water glass tube.

The casings 10 and 11 are initially about half filled with mercury 16. The mercury is used because it is relatively heavy and does not require such great distance of separation between the casings 10 and 11, and hence such a long tube 12. The pipe 14 and the casing 11, above the mercury 16, will be filled with the liquid from tank 13.

The space above the mercury in casing 10 and the tube 15 will contain the lighter indicating liquid 17. A casing 18 connected at its bottom end (Figures 1 and 2) to the water glass 15 serves as an overflow. It has a vent 19 near its upper end and a filling plug 20.

When pipe 14 is filled with liquid such as will be contained in the tank 13 and there is no liquid in the tank, the tube 12 should be of such length to balance the liquid in pipe 14 at which time liquid 17 should just appear at the bottom of the water glass 15.

It will now be manifest that when a liquid is placed in tank 13 to a given height, that liquid 17 will be correspondingly raised in glass 15, and when the liquid head in the tank 13 falls there will be a corresponding depression of liquid in the water glass 15. In each instance the distance of movement in glass 15 will be much greater than the movement in the tank 13.

To fill pipe 14 the globe valve 21 must be opened and globe valve 22 closed. The plug 20 in casing 18 should now be removed and mercury should be poured in to about half fill casings 10 and 11 whereupon liquid 17 must then be poured in casing 10 until it appears at the bottom end of the water glass 15. The globe valve 22 is now opened whereupon the mercury in 10, 11, and 12, and liquid 17 will substantially balance the liquid in pipe 14, the upper part of casing 11 and container or tank 13.

It is of course manifest that the length of pipe 14 must bear a known relation to the length of the relatively small mercury tube 12. When that relation has been established and the proper balance obtained further adjustment or recalibration will not be required.

The employment of an exceedingly small mercury tube 12 enables me to use a relatively small quantity of mercury.

The casing 23 and stand pipe 25 are used when the tank 13 contains a very viscous liquid or one that is liable to set and which will not readily flow through small pipes. When the liquid in the tank 13 (Figure 2) is very viscous, or too viscous to flow readily, a less viscous liquid that will flow readily, may be placed in casing 23. The casing 23 is divided by partition 26 into two chambers 27 and 28 to form a liquid trap.

The stand pipe 25, pipe 14 and casing 23 are filled with a relatively thin liquid which will freely flow. The liquid head in pipe 25 should correspond with the liquid head in the tank 13.

Figure 3 shows the manner of applying the device at a higher altitude and to a boiler under pressure. A water column 30 is connected to the boiler above and below the water level by pipes 29 and 31. A water gage glass 32 is attached to the column as usual.

The lower mercury casing 11 is connected above the mercury to the water gage glass 15 by a pipe 15'. In this instance the remote gage glass 15 is located at some elevation above the boiler. A return pipe 33 is connected to the top end of the glass 15. This pipe is used only when the pressure in the container 30 is above atmospheric pressure.

If the gage glass is to be located below the boiler, as in Figures 1 and 2, a return pipe, such as 33, should be connected to overflow casing 18 in place of plug 20 and to the top or steam space of the water column or boiler and the vent holes 19 should be closed. For convenience a condenser casing 34 may be connected in pipe 33 between the boiler and the casing 18.

Instead of connecting the gage glass 15 directly into one of the casings 10 or 11, a fitting 35 may be connected to pipe 15; which is connected to the upper part of casing 11, and the gage glass connected into the fitting.

Stuffing boxes 36 are shown about the water glass.

In Figure 4 tank 30' contains a liquid 37 under subatmospheric pressure, and the gage glass is shown located above the tank. From the number of examples disclosed it will be obvious that the elevational location of the gage glass 15, whether above or below the liquid container, tank or boiler, is purely a matter of choice.

The casings 10 and 11 with the connecting mercury tube 12 constitute the instrument of the invention.

The functioning of the instrument for adaptation to the various containers, open or closed, subjected to the various influences, abnormal pressure, sub-atmospheric pressure, or open to the atmosphere, and whether the indicating water glass be located above or below the elevation of the liquid container is a matter of choice made effective by slight modifications in the manner of connecting.

While I have used the term "mercury" in the claim for purpose of description, it is not intended as a word of limitation.

The means for calibrating the instrument, as shown in the drawings, is the iron stem 20' below the plug 20, as shown in Figure 1. The stem 20' may be attached to the plug 20 or it may be simply introduced into either of the casings 10 or 11. The office of the plug 20 is to reduce the cubical capacity of the chamber in the casing in which it may be inserted thereby to change the relation between the two casings.

The variation of head, or mercury level, in the chambers of casings 10 and 11 may be so infinitesimally small as to be barely discerned upon visible observation but in the water glass 15 there may be a responsive variation of several inches, making the indication more clearly apparent.

The differences in diameter of the casings 10 and 11 and the water tube causes the difference in the distances of elevation of the mercury in the two devices.

The device may be used to clearly indicate very small increments and decrements in the rise and fall of water in large reservoirs, covering large areas, in such cases where water is held incarcerated by a dam, and in which the actual variation of head is relatively small and the transition is slow.

In such situations the indicator may be placed at very remote distances from the reservoir and located above or below the reservoir and the bore of the water glass or indicating tube 15 should be relatively small in diameter with respect to the diameter of the mercury holding casings 10 and 11.

It will at once be manifest that when the mercury 16, in casing 10, rises, due to depression of the mercury in casing 11 and increase of head in 13, that the volume displaced by the mercury in casing 10 must displace an equal volume of the lighter liquid in the casing 10 above the mercury. As the chamber in casing 10 is full of liquid which can only find exit through tube 15, and the diameter of the tube 15 is infinitely smaller than the diameter of the chamber in casing 10, the rise of liquid in tube 15 will be greatly in excess of the rise of liquid in either chambers of casings 10 and 11. The reverse is true when the liquid head falls in chamber 13.

For the above reasons, the indication in tube 15 is very pronounced by an enlargement of movement of the indicating liquid.

With the present invention it is preferable or highly desirable to partially fill the casing 18 with a light, substantially transparent liquid, which liquid has a lower specific gravity than the indicating fluid in the tube 15, is non-miscible with the indicating fluid and floats thereupon. It has been found by practice that a light oil functions extremely well in this capacity.

By reason of the differences in the specific gravity of the two liquids in the indicating glass, an actual increase of movement in said indicating glass, or the multiplication of movement of the liquids therein, is possible.

For example; if the indicating glass is 10 inches long, the gravity of the indicating liquid is 1 and that of the oil above it is .95, then the head difference between the maximum and the minimum indication is equal to the difference of 10 inches of the indicating liquid and ten inches of the oil which would be .5 of an inch. Hence only .5 of head of water may be indicated by a 10 inch movement of liquid in the indicating glass, less the increased head due to the rise of the lighter fluid in the chamber 18, which may be regulated to suit the conditions by sizing the chamber accordingly. The relative cross sectional areas of the water glass and the chamber 10 will vary the extent of rise of liquid in the glass, and these relative areas are, of course, suitably proportioned.

I claim as my invention:

In an indicating device capable of ready assembly and dismantling and adapted for attachment to a system to be measured thereby, a pair of spaced casings one of which is in a higher plane than the other, a detachable pipe of relatively small diameter connecting said casings adjacent their bottoms, a relatively heavy liquid in said casings and pipe, one of said casings having an opening therein, closure means for said opening, said closure means being removable from said opening to allow said liquid to be introduced into both of said casings and said pipe, a substantially transparent tube detachably connected to one of said casings, an indicating liquid in said last mentioned casing and said tube disposed above said heavy liquid, and means for detachably connecting the other of said casings to the system to be measured.

In testimony whereof I have hereunto subscribed my name.

FREDERIC McNEILL.